United States Patent
Eun et al.

(10) Patent No.: US 7,936,848 B2
(45) Date of Patent: May 3, 2011

(54) APPARATUS AND METHOD FOR ESTIMATING CHANNEL IN BROADBAND WIRELESS ACCESS (BWA) COMMUNICATION SYSTEM

(75) Inventors: Yoo-Chang Eun, Seoul (KR); Jeong-Soon Park, Seoul (KR); Soo-Bok Yeo, Suwon-si (KR); Yong-Sun Hwang, Suwon-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 715 days.

(21) Appl. No.: 12/003,201

(22) Filed: Dec. 20, 2007

(65) Prior Publication Data

US 2008/0152043 A1    Jun. 26, 2008

(30) Foreign Application Priority Data

Dec. 21, 2006  (KR) .............................. 2006-0131579

(51) Int. Cl.
*H04L 27/06* (2006.01)
*H03D 1/00* (2006.01)

(52) U.S. Cl. ....................................... 375/340; 375/316

(58) Field of Classification Search .................. 375/340, 375/324, 322, 316; 704/500; 710/68; 382/276, 382/232; 455/214; 329/311, 315, 345, 347
See application file for complete search history.

(56) References Cited

U.S. PATENT DOCUMENTS

| | | | |
|---|---|---|---|
| 7,636,398 B2 * | 12/2009 | Lee et al. ...................... | 375/260 |
| 7,715,492 B2 * | 5/2010 | Seki .............................. | 375/295 |
| 2003/0072277 A1 | 4/2003 | Subrahmanya et al. | |
| 2003/0133435 A1 * | 7/2003 | Friedrich ...................... | 370/349 |
| 2006/0205437 A1 * | 9/2006 | Sung et al. ................. | 455/562.1 |
| 2007/0280365 A1 * | 12/2007 | Seki .............................. | 375/260 |
| 2008/0144730 A1 * | 6/2008 | Akella et al. ................. | 375/260 |
| 2010/0203828 A1 * | 8/2010 | Zheng .......................... | 455/12.1 |

FOREIGN PATENT DOCUMENTS

| | | |
|---|---|---|
| EP | 1367790 | 12/2003 |
| EP | 1580951 | 9/2005 |
| JP | 2002026861 | 1/2002 |
| JP | 2002064464 | 2/2002 |
| JP | 2005286636 | 10/2005 |
| WO | WO0217529 | 2/2002 |

* cited by examiner

*Primary Examiner* — Shuwang Liu
*Assistant Examiner* — Helene Tayong
(74) *Attorney, Agent, or Firm* — Roylance, Abrams, Berdo & Goodman, LLP (57) ABSTRACT

An apparatus and a method for estimating a channel in a Broadband Wireless Access (BWA) communication system are provided. The apparatus includes a subcarrier demapper for extracting pilot symbols at preset positions for a channel estimation; and a channel estimator for acquiring channel estimate values of subcarriers through an Infinite Impulse Response (IIR) filtering using the pilot symbols provided from the subcarrier demapper and a preset filter factor. Thus, the channel condition can be estimated by taking into account the channel change.

10 Claims, 8 Drawing Sheets

APPARATUS AND METHOD FOR ESTIMATING CHANNEL IN BROADBAND WIRELESS ACCESS (BWA) COMMUNICATION SYSTEM

CROSS-REFERENCE TO RELATED PATENT APPLICATION

This application claims the benefit under 35 U.S.C. §119 (a) of Korean Patent Application No. 2006-131579, filed on Dec. 21, 2006, in the Korean Intellectual Property Office, the entire disclosure of which is hereby incorporated by reference.

BACKGROUND OF THE INVENTION

1. Field of the Invention

The present invention relates to a channel estimating apparatus and method in a Broadband Wireless Access (BWA) communication system. More particularly, the present invention relates to an apparatus and a method for more accurately estimating a channel of adaptive Infinite Impulse Response (IIR) type by selecting a necessary filter factor in a receiver of an Orthogonal Frequency Division Multiplexing (OFDM) communication system.

2. Description of the Related Art

According to an OFDM scheme, a transmitter Quadrature Phase Shift Key (QPSK)-modulates or Quadrature Amplitude Modulation (QAM)-modulates frequency-domain digital information and converts the modulated information to a time-domain signal using an Inverse Fast Fourier Transform (IFFT) operation. In doing so, the transmitter typically sends a pilot subcarrier between a preamble symbol and a data subcarrier so that a receiver can easily estimate the channel. The receiver estimates the channel for the data subcarrier using the preamble symbol and the pilot subcarrier and uses the estimate value for the demodulation.

When an OFDM scheme is adopted in a mobile communication, a reception performance of the receiver mostly relies on how accurately the receiver estimates the varying channel while traveling around.

Figure 1:
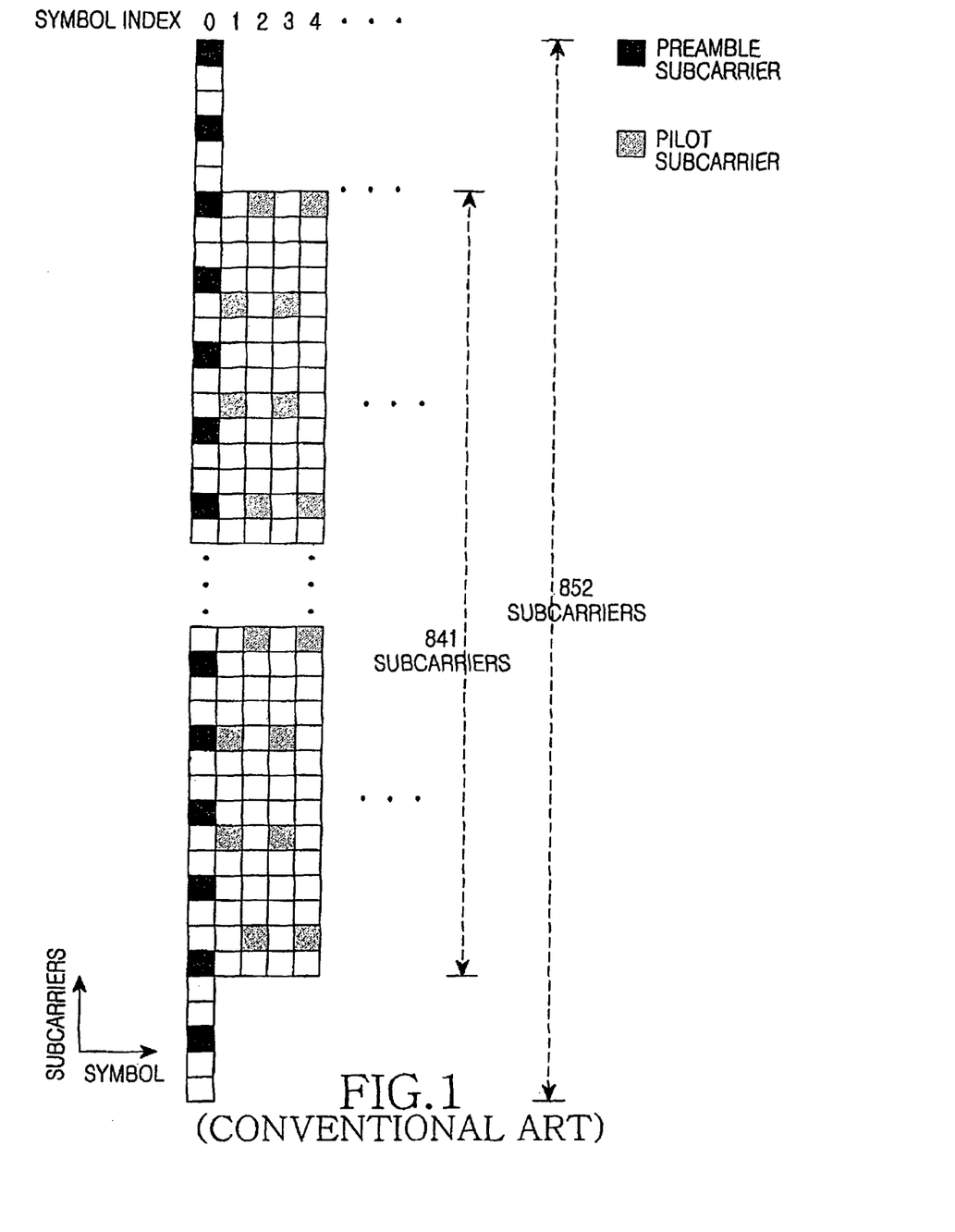
FIG. 1 is a diagram of a pattern of preamble and pilot subcarriers of a downlink in a start interval of a frame according to a conventional OFDMA system.

A frame structure in an Institute of Electrical and Electronics Engineers (IEEE) 802.16 Orthogonal Frequency Division Multiple Access (OFDMA) scheme is illustrated by referring to FIG. 1. FIG. 1 depicts a pattern of preamble and pilot subcarriers of a downlink in a start interval of a frame in a conventional OFDMA system.

The downlink of the OFDMA system carries frames each including preamble and pilot subcarriers per frame to the receiver. The receiver estimates a channel of the neighbor data subcarrier using the received frame as shown in FIG. 2.

Figure 2:
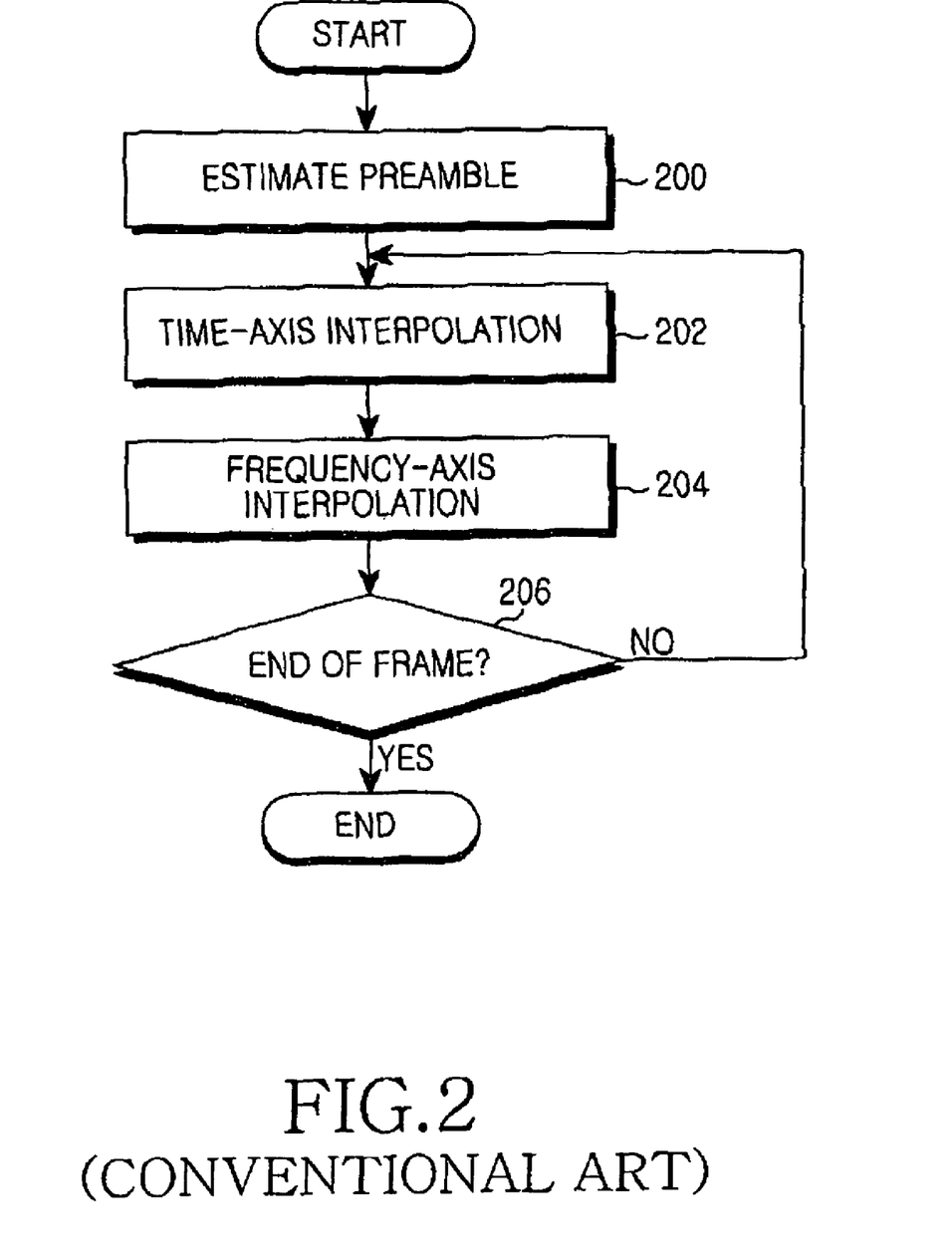
FIG. 2 is a flowchart of a channel estimation of a conventional channel estimating apparatus in the OFDMA system.

FIG. 2 is a flowchart of the channel estimation in a conventional channel estimating apparatus in the OFDMA system. Upon receiving the frame, the conventional channel estimating apparatus estimates channel estimate values for every subcarrier of the symbol index 0 by interpolating preamble subcarriers along a frequency axis in step 200 and estimates subcarrier estimate values of the neighbor symbol using a time-axis interpolation in step 202.

In step 202, the subcarrier channel estimate value of the symbol index 1 corresponding to the pilot subcarrier position k of the symbol index 2 is calculated by interpolating the subcarrier channel estimate value of the neighbor symbol along the time axis based on Equation (1).

$$H_1(k) = \frac{1}{2}H_0(k) + \frac{1}{2}H_2(k) \quad (1)$$

In Equation (1), $H_i(j)$ denotes a j-th subcarrier estimate value of an i-th symbol index.

The channel values of the subcarriers of the symbol index 2 can be acquired in the same manner. Accordingly, Equation (1) can be generalized as below; that is, the subcarrier estimate value of the symbol index n corresponding to the pilot subcarrier position k of the symbol index n+1 can be acquired by interpolating the subcarrier estimate value of the neighbor symbol along the time axis based on Equation (2).

$$H_n(k) = \frac{1}{2}H_{n-1}(k) + \frac{1}{2}H_{n+1}(k) \quad (2)$$

In Equation (2), $H_i(j)$ denotes a j-th subcarrier estimate value of an i-th symbol index.

Next, the conventional channel estimating apparatus estimates the channel for every subcarrier of the symbol index by applying the frequency-axis interpolation using the subcarrier estimate values acquired using the pilot symbols and the time-axis interpolation in step 204, and determines whether the channel is estimated up to the end of the frame in step 206. When the channel estimation is not completed in step 206, the conventional channel estimating apparatus goes back to step 202. Otherwise, the conventional channel estimating apparatus finishes the process of FIG. 2.

However, disadvantageously, the channel estimating method of FIG. 2 performs the one-dimensional time/frequency-axis interpolations without considering the channel condition and makes use of the previous symbol estimate value such as preamble for the next symbol channel estimation even when the temporal change of the channel is not so great (e.g., low-speed environment).

Accordingly, there is a need for an improved apparatus and the method for estimating a channel by selecting a necessary filter factor when the receiver of the BWA communication system estimates a channel of an adaptive IIR type, which can provide a far more accurate channel estimate value by promptly adapting to the channel change.

SUMMARY OF THE INVENTION

Exemplary embodiments of the present invention address at least the above problems and/or disadvantages and provide at least the advantages described below. Accordingly, an aspect of an exemplary embodiment of the present invention is to provide a channel estimating apparatus and method in a Broadband Wireless Access (BWA) communication system.

Another aspect of exemplary embodiments of the present invention is to provide an apparatus and a method for estimating a channel using an adaptive Infinite Impulse Response (IIR) filter in a receiver of a BWA communication system.

Yet another aspect of exemplary embodiments of the present invention is to provide an apparatus and a method for estimating a channel by selecting a necessary filter factor for an adaptive IIR channel in a receiver of a BWA communication system.

The above exemplary embodiments are achieved by providing an apparatus for estimating a channel in a BWA communication system, which includes a subcarrier demapper for extracting pilot symbols at preset positions for a channel estimation; and a channel estimator for acquiring channel estimate values of subcarriers through an IIR filtering using the pilot symbols provided from the subcarrier demapper and a preset filter factor.

According to an aspect of exemplary embodiments of the present invention, a method for estimating a channel in a BWA communication system includes estimating channels of preamble subcarriers when a frame is received; estimating subcarrier estimate values of a neighbor symbol through a time-axis interpolation; IIR-filtering the subcarriers estimated through the time-axis interpolation using a preset filter factor; and estimating channels of all of subcarriers of a symbol index through a frequency-axis interpolation using the filtered subcarrier estimate values.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for estimating a channel by selecting a necessary filter factor when a receiver of a Broadband Wireless Access (BWA) communication system estimates the channel of an adaptive Infinite Impulse Response (IIR) type. The apparatus is described by referring to FIG. 3.

Figure 3:
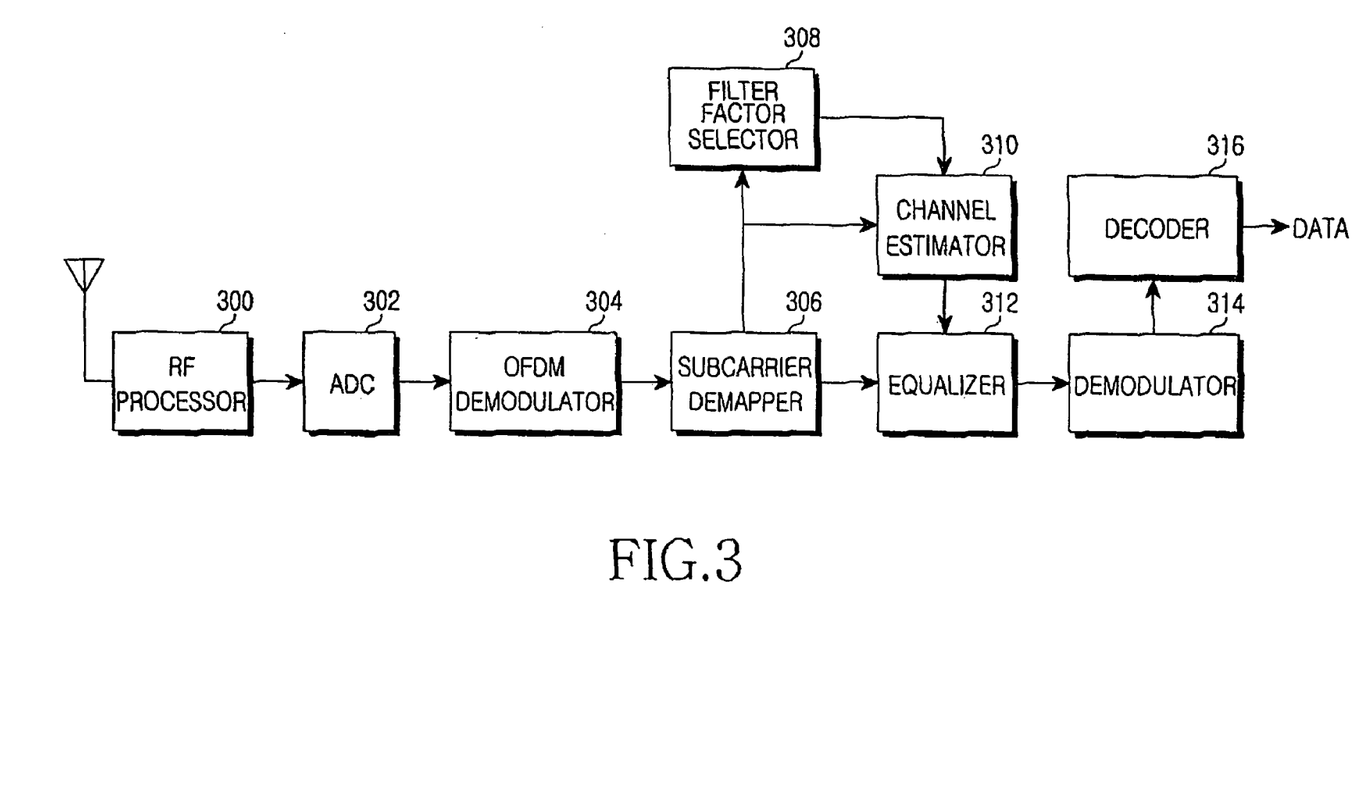
FIG. 3 is a block diagram of a receiver in a BWA communication system, which estimates a channel using an IIR filter according to an exemplary embodiment of the present invention.

FIG. 3 is a block diagram of a receiver in a BWA communication system, which estimates a channel using an IIR filter according to an exemplary embodiment of the present invention. Herein, in relation to the receiver, a base station can be a transmitter in terms of an uplink and a terminal can be a transmitter in terms of a downlink.

The receiver of FIG. 3 includes a Radio Frequency (RF) processor 300, an Analog/Digital Converter (ADC) 302, an Orthogonal Frequency Division Multiplexing (OFDM) demodulator 304, a subcarrier demapper 306, a filter factor selector 308, a channel estimator 310, an equalizer 312, a demodulator 314, and a decoder 316.

The RF processor 300 includes components such as a front end unit and a filter, to convert an RF signal passing through a radio channel to a baseband signal. The ADC 302 converts the analog baseband signal output from the RF processor 300 to a digital signal.

The OFDM demodulator 304 removes a Cyclic Prefix (CP) from the data output from the ADC 302 and outputs frequency-domain data through Fast Fourier Transform (FFT).

The subcarrier demapper 306 extracts actual data symbols from the data output from the OFDM demodulator 304 and provides the extracted data symbols to the equalizer 312. The subcarrier demapper 306 extracts symbols at preset positions (e.g., pilot symbols) for the channel estimation and provides the extracted symbols to the filter factor selector 308 and the channel estimator 310.

The filter factor selector 308 selects a necessary filter factor per frame for the IIR filtering using the pilot symbols provided from the subcarrier demapper 306 and provides the selected filter factor to the channel estimator 310. The filter factor selector 308, which is optional, may not be included in the receiver. The filter factor selector 308 will be described in more detail by referring to FIG. 7.

The channel estimator 310 estimates a channel using the pilot symbols fed from the subcarrier demapper 306. The channel estimator 310 estimates a subcarrier estimate value of a neighbor symbol through a time-axis interpolation, IIR-filters the subcarrier estimated through the time-axis interpolation using the filter factor selected by the filter factor selector 308, estimates a channel for every subcarrier of the symbol index by applying a frequency-axis interpolation using the filtered subcarrier estimate value, and provides the channel estimate values to the equalizer 312. If the filter factor selector 308 is absent, a preset experimental filter factor is used.

The equalizer 312 channel-compensates for the data symbols output from the subcarrier demapper 306 using the channel estimate values output from the channel estimator 310. Namely, the equalizer 312 compensates for various noises generating in the radio channel.

The demodulator 314 output coded data by demodulating the symbols output from the equalizer 312 using a modulation scheme of the transmitter. The decoder 316 restores original information data by decoding the coded data output from the demodulator 314 using a coding scheme of the transmitter.

Figure 4:
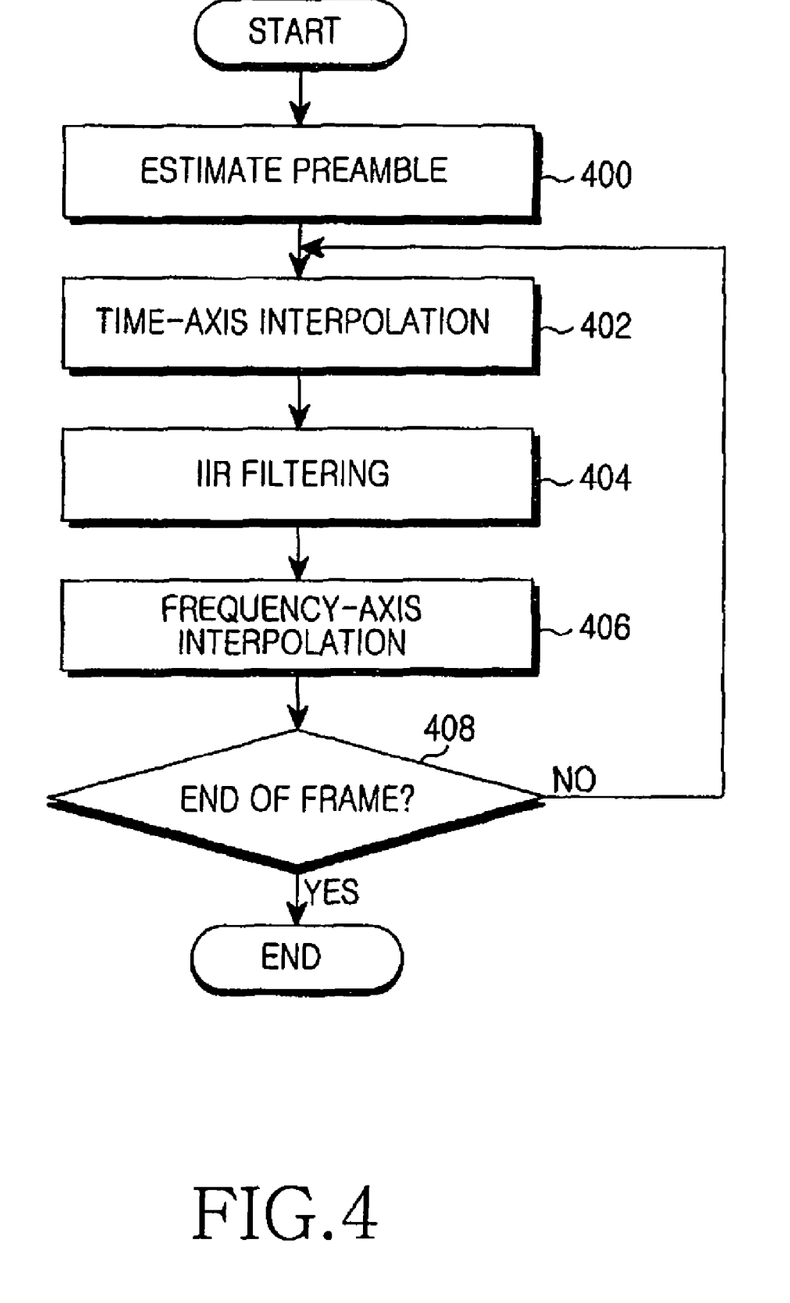
FIG. 4 is a flowchart of a channel estimation of a channel estimating apparatus in the BWA communication system according to an exemplary embodiment of the present invention.
Figure 5:
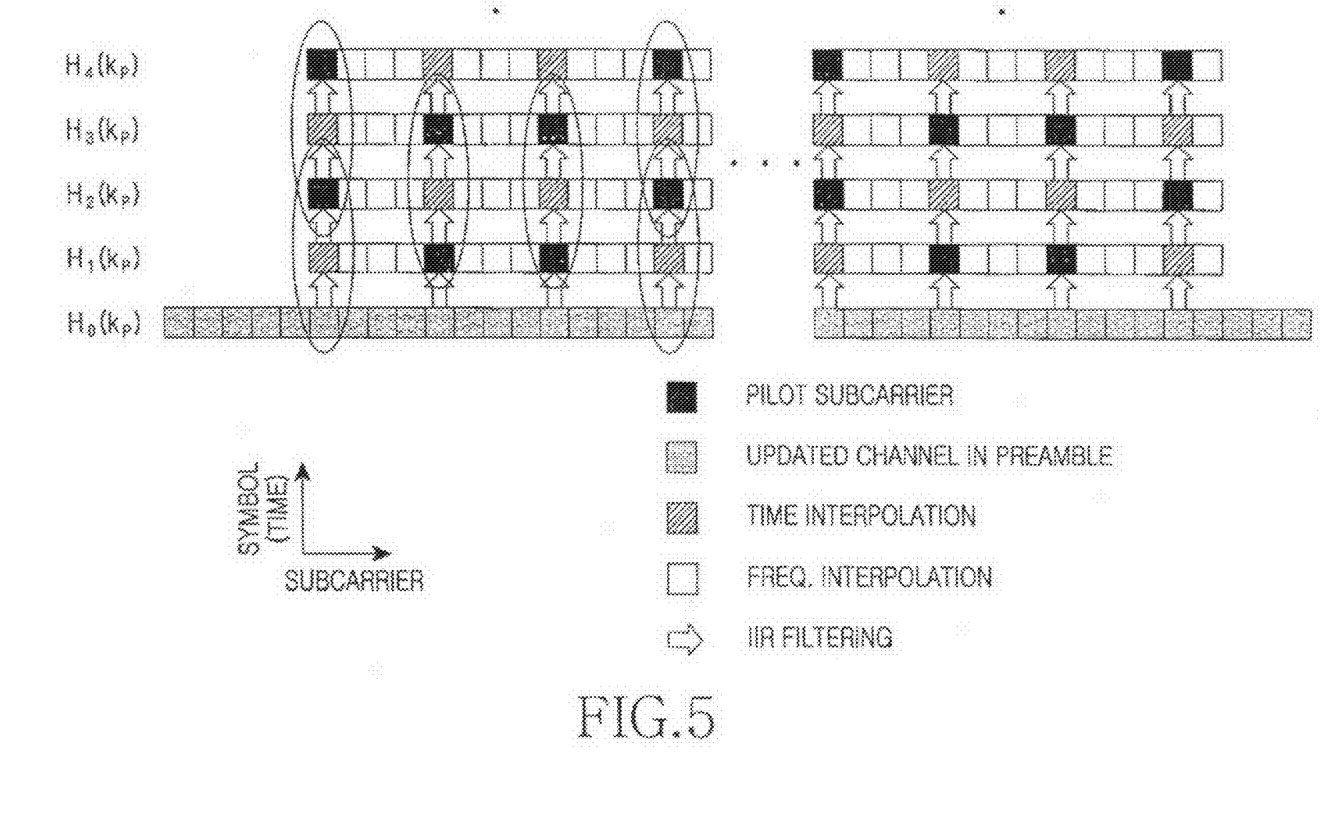
FIG. 5 is a diagram of a frame when the channel estimating apparatus of an OFDMA system estimates the channel by using an IIR filter according to an exemplary embodiment of the present invention.

Now, a channel estimating method in the BWA communication system is described by referring to the drawing. FIG. 4 is a flowchart of the channel estimating method of the channel estimating apparatus in the BWA communication system according to an exemplary embodiment of the present invention. The descriptions of FIG. 4 are based on FIG. 5. FIG. 5 depicts a frame when the channel estimating apparatus of an OFDMA system estimates the channel by using an IIR filter according to an exemplary embodiment of the present invention.

Upon receiving a frame, the channel estimating apparatus estimates a channel estimate value for every subcarrier of the symbol index 0 by interpolating preamble subcarriers along the frequency axis in step 400, and estimates subcarrier estimate values of a neighbor symbol by interpolating along the time axis in step 402.

For example, in step 402, the subcarrier channel estimate value in the symbol index 1 corresponding to the pilot subcarrier position k in the symbol index 2 is acquired by interpolating the subcarrier channel estimate value of the neighbor symbol along the time axis based on Equation (1).

The subcarrier estimate value in the symbol index n corresponding to the pilot subcarrier position k in the symbol index n+1 can be acquired by interpolating the subcarrier estimate value of the neighbor symbol along the time axis based on Equation (2).

In step 404, the channel estimating apparatus IIR-filters the subcarrier estimated through the time-axis interpolation using the preset experimental IIR filter factor.

In a mobile WiMAX system which is the representative example of IEEE 802.16 OFDMA system, the transmit power of the pilot subcarrier is greater than that of the data subcarrier by 2.5 dB and the transmit power of the preamble subcarrier is greater than that of the pilot subcarrier by 6.5 dB. Since the transmit power of the preamble subcarrier is the greatest one in most cases, the gain can be expected in terms of the performance when the IIR filtering is applied based on Equation (3) after the time-axis interpolation (or after the time-axis interpolation and the frequency-axis interpolation). Herein, the IIR filtering is executed for each given subcarrier j. To acquire the IIR-filtered channel estimate value $\check{H}_i(j)$ for the i-th symbol, a certain rate of the channel estimate values $(\check{H}_{i-1}(j), \check{H}_{i-2}(j), \ldots)$ of the previous symbols are accumulated on the estimate value $\check{H}_i(j)$ of the current symbol. As described earlier, the IIR filtering is defined as a linear system which feeds back the past output as the input to acquire the current output. The IIR filtering features little time delay because it can carry out the channel estimation and the data demodulation in sequence along the time axis. While a plurality of previous values can be accumulated on the current output in the IIR filtering in step 404, only the previous channel estimate value is used as the feedback input as expressed in Equation (3) for ease of understanding.

$$\check{H}_n(l)=(1-\gamma)\check{H}_{n-1}(l)+\gamma H_n(l), n \geq 1 \quad (3)$$

In Equation (3), $\check{H}_i(j)$ denotes the IIR-filtered channel estimate value for the j-th subcarrier of the i-th symbol index, and γ is a weight value for setting the accumulation range of the channel estimate values of the previous symbols. γ is determined based on the channel condition.

When two feedback inputs are fed to the extended Equation (3), Equation (4) can be obtained. Thus, it is possible to extend the concept of the multiple feedbacks.

$$\check{H}_n(l)=(1-\gamma_0-\gamma_1)\check{H}_{n-2}(l)+\gamma_1 \check{H}_{n-1}(l)+\gamma H_n(l), n \geq 2 \quad (4)$$

Next, the channel estimating apparatus estimates the channel of every subcarrier of the symbol index by applying the frequency-axis interpolation using the filtered subcarrier estimate values in step 406, and determines whether the channel estimation is completed up to the end of the frame in step 408. When the channel estimation is not completed in step 408, the channel estimating apparatus goes back to the step 402. When the channel estimation is completed in step 408, the channel estimating apparatus finishes the process of FIG. 4.

Since γ in Equation (3) greatly affects the reception performance based on the channel condition, it is necessary to select a proper value based on the channel change. In the static channel, the small IIR filter factor γ of Equation (3) exhibits the better performance. By contrast, in the severe channel change, the great filter factor γ exhibits the better performance. For example, when the terminal travels fast at the speed over 60 km/h, the best performance is acquired with the filter factor γ of 1. When the filter factor γ is 1, Equation (3) does not substantially IIR-filter the previous channel estimate values, which implies that only the conventional time-axis and frequency-axis interpolations are conducted. That is, it is advantageous that the previous estimate value is rarely reflected on the next estimate value under the severe channel change. To the contrary, in the proximity of an Additive White Gaussian Noise (AWGN) channel, the smaller filter factor γ exhibits the better performance. In other words, when the channel has the less temporal change, it is advantageous to reflect the channel estimate value of the preamble of the relative great power on the subsequent symbols.

Figure 6:
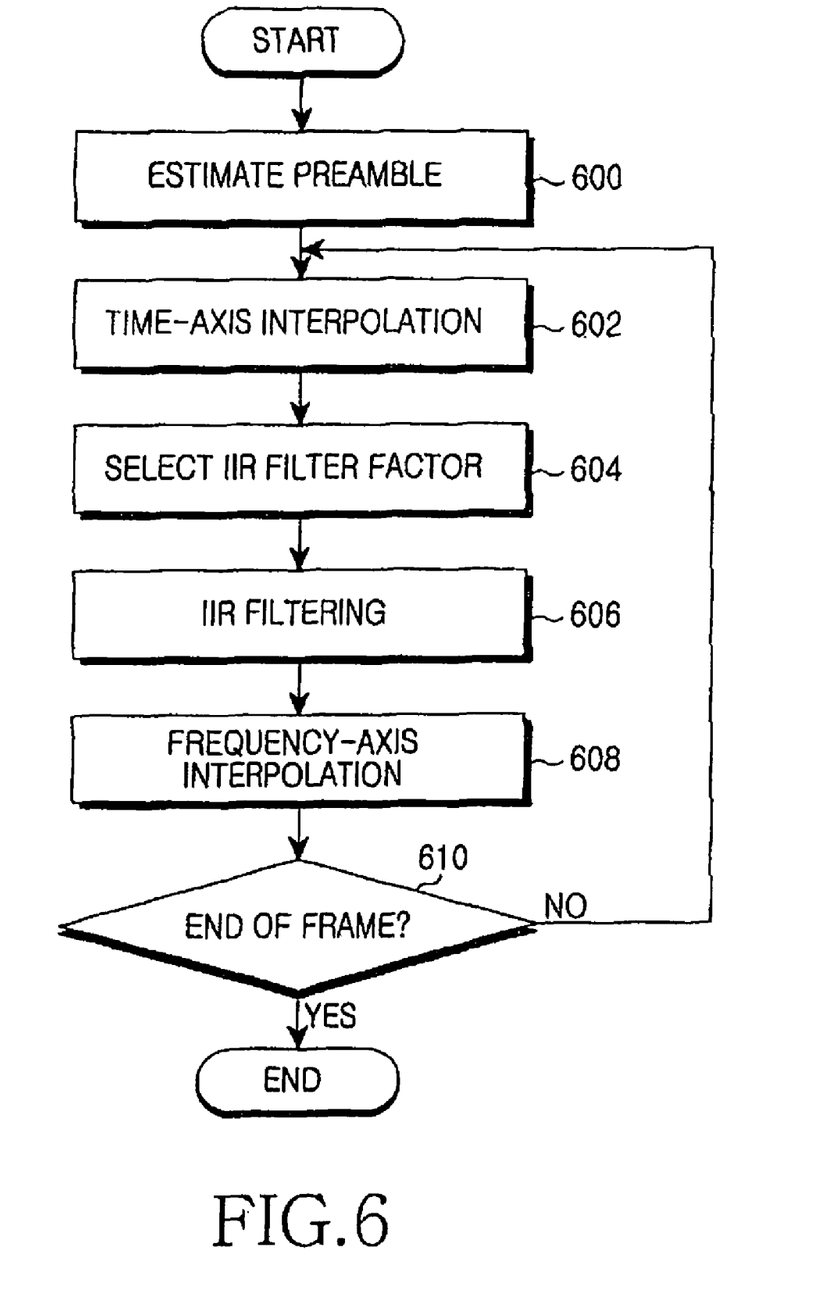
FIG. 6 is a flowchart of a channel estimation of a channel estimating apparatus of a BWA communication system according to another exemplary embodiment of the present invention.

Now, a channel estimating method according to another exemplary embodiment of the present invention, which IIR-filters by selectively selecting the filter factor based on the channel condition, is explained by referring to FIG. 6. FIG. 6 is a flowchart of the channel estimating method of a channel estimating apparatus of a BWA communication system according to another exemplary embodiment of the present invention.

Upon receiving a frame, the channel estimating apparatus estimates channel estimate values for every subcarrier of the symbol index 0 by interpolating the preamble subcarriers along the frequency axis in step 600, estimates subcarrier estimate values of the neighbor symbol through the time-axis interpolation based on Equation (2) in step 602, and selects a filter factor for the IIR filtering in step 604. The step 604 will be described in further detail by referring to FIG. 7.

Next, the channel estimating apparatus IIR-filters the subcarriers estimated through the time-axis interpolation using the filter factor selected in step 604 based on Equation (3) in step 606, estimates channels of every subcarrier of the symbol index by applying the frequency-axis interpolation using the filtered subcarrier estimate values in step 608, and determines whether the channel estimation to the end of the frame is completed in step 610. When the channel estimation is not completed in step 610, the channel estimating apparatus goes back to step 602. When the channel estimation is completed, the channel estimating apparatus finishes the process of FIG. 6.

Figure 7:
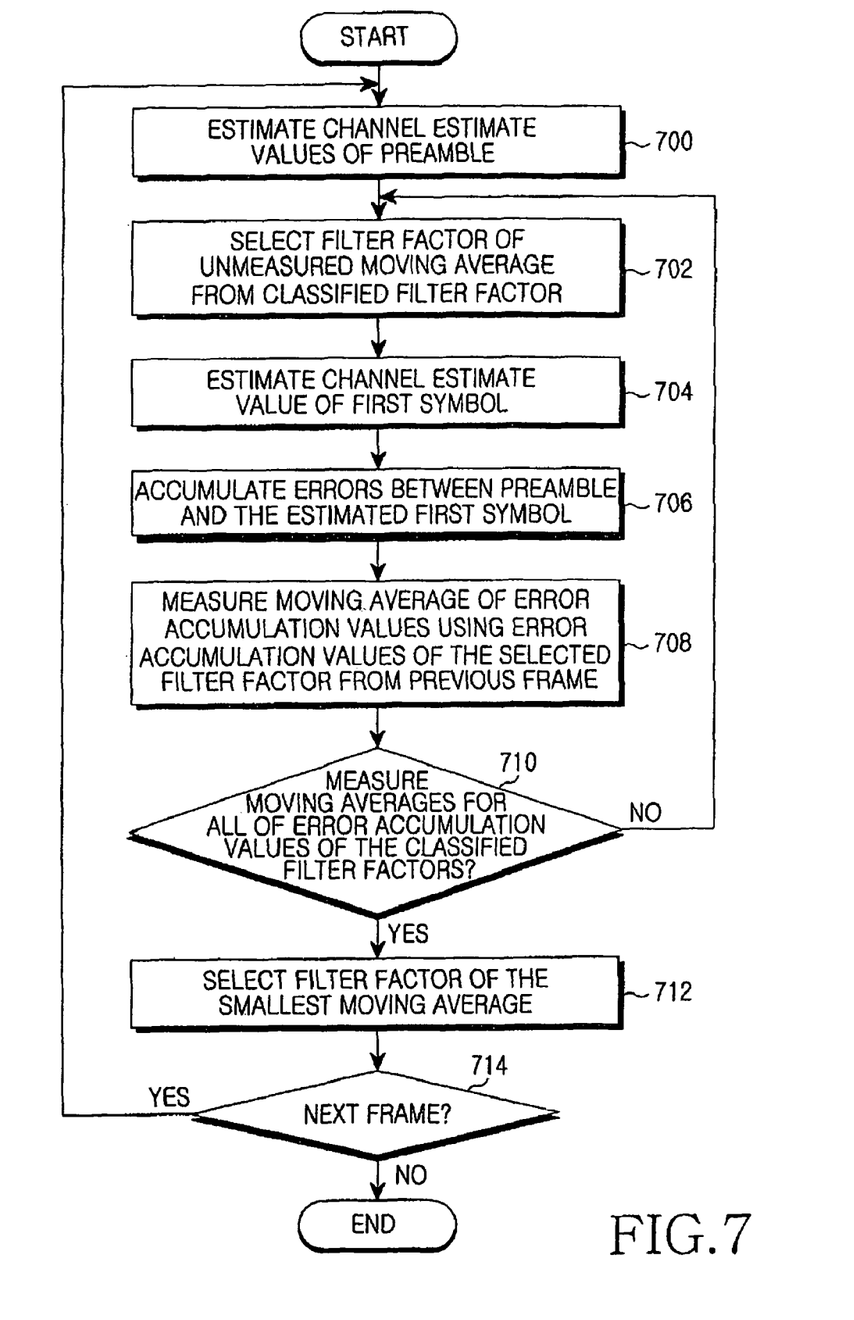
FIG. 7 is a flowchart of a necessary filter factor selection when the channel estimating apparatus of the BWA communication system estimates the channel according to an exemplary embodiment of the present invention.

The measurement of the filter factor for the IIR filtering is now described by referring to FIG. 7. FIG. 7 is a flowchart of a necessary filter factor selection when the channel estimating apparatus of the BWA communication system estimates the channel according to an exemplary embodiment of the present invention.

The filter factor selector estimates channel estimate values of the preamble $H_0$ in step 700. When the preamble subcarriers are present at the intervals of the subcarriers as in the preamble structure of FIG. 1, the filter factor selector first estimates the channels of the pilot subcarriers and then estimates the channels of the other subcarriers using the frequency-axis interpolation.

In step 702, the filter factor selector selects a filter factor of which the moving average for the error accumulation value is not measured among the classified filter factors. Herein, the classified filter factors are candidates of the preset filter factor. When the filter factor is selected in the range from 0 to 1, for example, the filter factor candidates at the interval 0.25 can be (0.25, 0.5, 0.75, 1.00). Namely, $\gamma_j$ denotes the j-th filter factor of the classified filter factor candidates. When the IIR filter has the degree more than the first degree with the multiple feedback inputs as shown in Equation (4), the filter factor can be a proper combination within the limited candidate sets by extending one filter factor. Yet, this is derived from the single filter factor. In an exemplary embodiment of the present invention, the single filter factor is illustrated as an example.

In step 704, the filter factor selector estimates the channel estimate value of the first symbol using the filter factor selected in step 702 and the symbols after the preamble (the symbol index 0). More specifically, the filter factor selects estimates the channel estimate value $H_1^j(k)$ for the k-th subcarrier of the first symbol (the symbol index 1) by applying the IIR filtering using the j-th filter factor $\gamma_j$ selected for the symbols excluding the preamble, without using the preamble.

Figure 8:
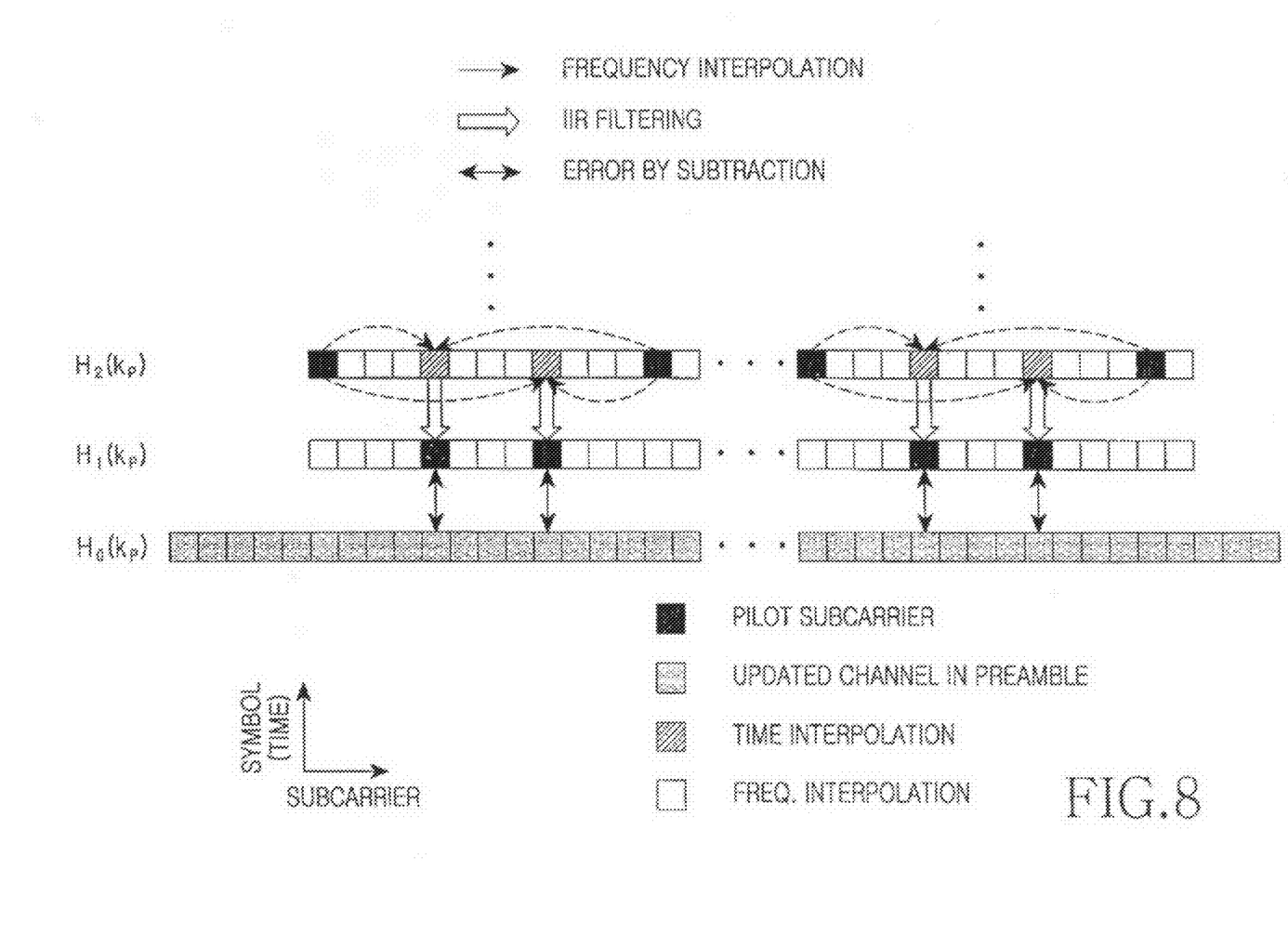
FIG. 8 is a diagram of the estimation of the channel estimate value for the subcarriers of the first symbol when the channel estimating apparatus of the BWA communication system uses symbols after the preamble according to an exemplary embodiment of the present invention.

FIG. 8 is a diagram of the estimation of the channel estimate value for the subcarriers of the first symbol when the channel estimating apparatus of the BWA communication system uses symbols after the preamble according to an exemplary embodiment of the present invention.

FIG. 8 illustrates the step 704. The subcarrier channel estimate value of the second symbol corresponding to the pilot subcarrier position of the first symbol is acquired by interpolating the pilot subcarrier of the second symbol. Next, the channel estimate values for the pilot subcarriers of the first symbol are acquired by IIR-filtering the channel estimate values of the same subcarriers in the second symbol (the symbol index 2). Unlike Equation (3), this procedure proceeds to the direction of the decreasing symbol index as expressed in Equation (5). Generally, there is no need to limit the subcarrier for the error to the pilot subcarrier position of the first symbol and the IIR can be applied to two or more symbols as shown in FIG. 7. In this case, the IIR filtering is applied by repeating Equation (5).

$$\check{H}_1(l) = (1-\gamma_j)H_2(l) + \gamma_j H_1(l) \quad (5)$$

In Equation (5), $H_i(j)$ denotes the j-th subcarrier estimate value of the i-th symbol index, $\check{H}_i(j)$ denotes the IIR-filtered channel estimate value for the j-th subcarrier of the i-th symbol index, and $\gamma_j$ denotes the j-th filter factor of the classified filter factor candidates.

In step 706, the filter factor selector accumulates the errors between the preamble estimated in step 700 and the first symbol estimated in step 704. For the sake of the computational complexity and accuracy, only the error corresponding to the pilot subcarrier position of the first symbol can be accumulated. The error accumulation value can be measured based on Equation (6).

$$\delta^{j(n)} = \sum_k |H_0(k) - H_1^j(k)|^2 \quad (6)$$

In Equation (6), $\delta^{j(n)}$ denotes the error accumulation value of the n-th frame when the j-th filter factor $\gamma_j$ of the classified filter factor candidates is used, $H_0(k)$ denotes the channel estimate value for the k-th subcarrier of the preamble, and $H_1^j(k)$ denotes the channel estimate value for the k-th subcarrier of the first symbol.

Equation (6) squares and accumulates the errors to measure the error accumulation value. However, in the actual implementation, instead of the square function, the summation of the absolute values of the real part and the imaginary part may be used for the computational simplicity. In spite of the great computational difference, there is little difference between the two computations in view of the performance.

In step 708, the filter factor selector measures the moving average which averages the error accumulation values for the selected filter factor from the current frame to the previous frame by the present number based on Equation (7).

$$\Delta^j = \frac{1}{N}(\delta^{j(n)} + \delta^{j(n-1)} + \ldots + \delta^{j(n-N+1)}) \quad (7)$$

In Equation (7), $\Delta^j$ denotes the moving average when the j-th filter factor $\gamma_j$ is used among the classified filter factor candidates, N denotes a number of recent frames preset to measure the moving average, and $\delta^{j(n)}$ denotes the error accumulation value of the n-th frame using $\gamma_j$.

In step 710, the filter factor selector determines whether the moving average is measured for the error accumulation values of each of the classified filter factors. When there exists a filter factor of the unmeasured moving average in step 710, the filter factor selector goes back to step 702.

When there is no filter factor of the unmeasured moving average in step 710, the filter factor selector selects the filter factor of the smallest moving average from the moving averages of the classified filter factors in step 712. The filter factor selected in step 710 is applied to the IIR filtering of the current frame or the next frame.

In step 714, the filter factor selector determines whether there exists a next frame. When there is the next frame received, the filter factor selector goes back to step 700. When there is no next frame, the filter factor selector finishes the process of FIG. 7.

As set forth above, the apparatus and the method for estimating the channel by selecting the necessary filter factor when the receiver of the BWA communication system estimates the channel of the adaptive IIR type can provide far more accurate channel estimate value by promptly adapting to the channel change.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. An apparatus for estimating a channel in a Broadband Wireless Access (BWA) communication system, comprising:
   a subcarrier demapper for extracting pilot symbols at preset positions for a channel estimation;
   a channel estimator for acquiring channel estimate values of subcarriers through an Infinite Impulse Response (IIR) filtering using the pilot symbols provided from the subcarrier demapper and a preset filter factor value based on changes in the channel condition; and
   a filter factor selector for selecting an optimal filter factor required for the IIR filtering per frame among a plurality of pre-classified filter factors using the pilot symbols provided from the subcarrier demapper,
   wherein the channel estimator performs the IIR filtering using the filter factor selected by the filter factor selector, instead of the preset filter factor, wherein the filter factor selector estimates a channel estimate value of a preamble, estimates a channel estimate value of a first symbol by applying the IIR filtering using symbols after the preamble with respect to each of the pre-classified filter factors, measures an error accumulation value which accumulates errors between the preamble and the estimated first symbol for each of the pre-classified filter factor, measures a moving average which averages the error accumulation values during a preset number of frames with respect to each of the pre-classified filter factors, and provides a filter factor of the smallest moving average among the measured moving averages to the channel estimator.

2. The apparatus of claim 1, wherein the filter factor selector estimates the channel estimate value of the first symbol using the symbols after the preamble with respect to each of the pre-classified filter factors based on the following equation:

$$\check{H}_1(l)=(1-\gamma_j)H_2(l)+\gamma_j H_1(l),$$

where $H_i(j)$ denotes a j-th subcarrier estimate value of an i-th symbol index, $\check{H}_i(j)$ denotes an IIR-filtered channel estimate value for the j-th subcarrier of the i-th symbol index, and $\gamma_j$ denotes a j-th filter factor of classified filter factor candidates.

3. The apparatus of claim 1, wherein the filter factor selector measures the error accumulation value which accumulates the errors between the preamble and the estimated first symbol with respect to each of the pre-classified filter factors based on the following equation:

$$\delta^{j(n)} = \sum_k |H_0(k) - H_1^j(k)|^2,$$

where $\delta^{j(n)}$ denotes an error accumulation value of an n-th frame when the j-th filter factor $\gamma_j$ of the classified filter factor candidates is used, $H_0(k)$ denotes a channel estimate value for a k-th subcarrier of the preamble, and $H_1^j(k)$ denotes a channel estimate value for the k-th subcarrier of the first symbol.

4. The apparatus of claim 3, wherein the filter factor selector accumulates only errors corresponding to pilot subcarrier positions of the first symbol to measure the error accumulation value which accumulates the errors between the preamble and the estimated first symbol with respect to each of the pre-classified filter factors.

5. The apparatus of claim 1, wherein the filter factor selector measures the moving average which averages the error accumulation values during a preset number of frames with respect to each of the pre-classified filter factors based on the following equation:

$$\Delta^j = \frac{1}{N}(\delta^{j(n)} + \delta^{j(n-1)} + \ldots + \delta^{j(n-N+1)}),$$

where $\Delta^j$ denotes a moving average when the j-th filter factor $\gamma_j$ is used among the classified filter factor candidates, N denotes a number of recent frames preset to measure the moving average, and $\delta^{j(n)}$ denotes an error accumulation value of the n-th frame using $\gamma_j$.

6. A method for estimating a channel in a Broadband Wireless Access (BWA) communication system, the method comprising the steps of:

estimating channels of preamble subcarriers when a frame is received;

estimating subcarrier estimate values of a neighbor symbol through a time-axis interpolation;

Infinite Impulse Response (IIR)-filtering the subcarriers estimated through the time-axis interpolation using a preset filter factor value based on changes in the channel condition;

estimating channels of all of subcarriers of a symbol index through a frequency-axis interpolation using the filtered subcarrier estimate values; AND selecting an optimal filter factor required for the IIR filtering among a plurality of pre-classified filter factors, wherein the IIR filtering uses the selected filter factor instead of the preset filter factor, wherein the optimal filter factor selecting comprises:

estimating a channel estimate value of a first symbol using symbols after the preamble with respect to each of the pre-classified filter factors by applying the IIR filtering;

measuring error accumulation values which accumulate errors between the preamble and the estimated first symbol with respect to each of the pre-classified filter factors;

measuring moving averages which average the error accumulation values during a preset number of frames with respect to each of the pre-classified filter factors; and selecting a filter factor of the smallest moving average among the measured moving averages as the optimal filter factor.

7. The method of claim 6, wherein the channel estimate value of the first symbol using the symbols after the preamble with respect to each of the pre-classified filter factors is estimated by applying the IIR filtering based on the following equation:

$$\check{H}_1(l)=(1-\gamma_j)H_2(l)+\gamma_j H_1(l),$$

where $H_i(j)$ denotes a j-th subcarrier estimate value of an i-th symbol index, $\check{H}_i(j)$ denotes an IIR-filtered channel estimate value for the j-th subcarrier of the i-th symbol index, and $\gamma_j$ denotes a j-th filter factor of classified filter factor candidates.

8. The method of claim 6, wherein the error accumulation value which accumulates the errors between the preamble and the estimated first symbol with respect to each of the pre-classified filter factors is measured based on the following equation:

$$\delta^{j(n)} = \sum_k |H_0(k) - H_1^j(k)|^2,$$

where $\delta^{j(n)}$ denotes an error accumulation value of an n-th frame when the j-th filter factor $\gamma_j$ of the classified filter factor candidates is used, $H_0(k)$ denotes a channel estimate value for a k-th subcarrier of the preamble, and $H_1^j(k)$ denotes a channel estimate value for the k-th subcarrier of the first symbol.

9. The method of claim 8, wherein, when the error accumulation value which accumulates the errors between the preamble and the estimated first symbol with respect to each of the pre-classified filter factors is measured, the only errors corresponding to pilot subcarrier positions of the first symbol are accumulated.

10. The method of claim 6, wherein the moving average which averages the error accumulation values during a preset number of frames with respect to each of the pre-classified filter factors is measured based on the following equation:

$$\Delta^j = \frac{1}{N}(\delta^{j(n)} + \delta^{j(n-1)} + \ldots + \delta^{j(n-N+1)}),$$

where $\Delta^j$ denotes a moving average when the j-th filter factor $\gamma_j$ is used among the classified filter factor candidates, N denotes a number of recent frames preset to measure the moving average, and $\delta^{j(n)}$ denotes an error accumulation value of the n-th frame using $\gamma_j$.

* * * * *